United States Patent Office 3,259,568
Patented July 5, 1966

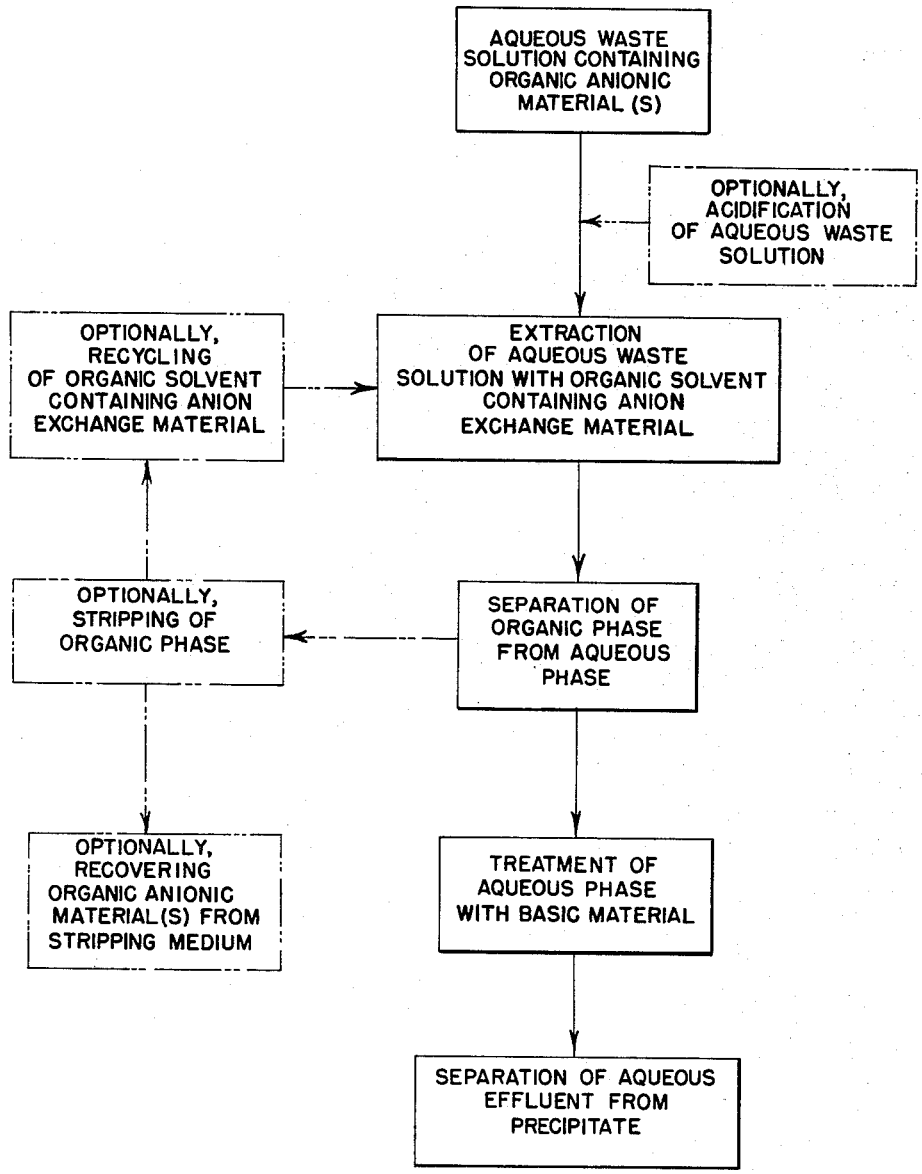

3,259,568
TREATMENT OF AQUEOUS WASTE SOLUTIONS
Wesley A. Jordan, Minneapolis, Herbert N. Dunning, St. Paul, and Le Roy T. Ditsch, Minneapolis, Minn., assignors to General Mills, Inc., a corporation of Delaware
Filed Mar. 21, 1963, Ser. No. 267,038
17 Claims. (Cl. 210—28)

This invention relates to a process of treating aqueous solutions to remove and/or recover various materials or contaminants therefrom. More particularly, it relates to an improved method for the treatment of detergent-laden wastes.

The removal of surface active materials is of particular interest in the treatment of sewage and industrial wastes. The separation of surfactants from sewage has recently become more acute with the wide-spread use of anionic detergents, particularly of the alkyl aryl sulfonate type. Unlike the previously used soaps, these detergents are not readily consumed by bacteria and other organisms. Accordingly, when sewage containing an alkyl aryl sulfonate is discharged into a river or lake or disposed of underground, the alkyl aryl sulfonate becomes a more or less permanent addition to the body of water. In rivers, the amount of detergent builds as the river flows past communities discharging detergent containing sewage. In many parts of this country, lakes and ground water are already contaminated with detergents. In most sections of the country, this problem is presently not acute. However, the levels of detergent in these bodies of water will continue to grow, and in the future, will present a hazard not only to drinking water for human consumption, but also to fish and other life dwelling in our lakes and rivers. Further, it may render the water unuseable in many present commercial operations. At the present time in some localities of the country the level of detergent in the available water supply is sufficiently high to affect adversely the foaming properties of beer made therefrom. In anticipation of the continuing build up of detergents, some breweries are considering processes for removing detergent from their water supply. This is just one example of many industries whose products or processes require water of high purity.

In the United States, launderettes have become quite popular. If the detergents were removed from the sewage of laundries and laundromats, the amount of contamination of water supplies would be considerably reduced. In addition to this immediate problem, is the treatment of the entire sewage and industrial wastes of factories and communities.

There has been very little success in adopting known separative processes to the removal of detergents and other surfactants from sewage and industrial wastes. This is primarly because of the large volumes of material to be handled and the low concentration of detergents. In order for any method to be practical, there must be a very low cost per unit of material treated. The difficulties in adapting known separative processes to sewage treatment are illustrated by considering a process such as solvent extraction. This process has been mentioned in the prior art as a method of purifying sewage by removal of greases and other organic-soluble materials. In a solvent extraction process large amounts of solvents are generally required. In many cases these solvents present hazards of fire and explosion. Low volatility solvents often do not provide the necessary extraction efficiency. There are also the problems of the contamination of the treated material with the extracting solvent and the expense involved in the attrition of the solvent. Perhaps the greatest difficulty with solvent extraction is the cost of separating the solvent and the extracted materials. Generally, distillation or some other expensive process is required.

A method which has also been suggested for the treatment of waste water is the foam fractionation method. Using this technique, liquids containing surface active compounds are foamed by passing a gas through the liquid. The foam is then recovered and condensed. It is found that the concentration of the surface active agents is higher in the condensate than in the residual liquid or the original feed solution. The difficulty with the foam fractionation process is that considerable equipment is required to handle and condense the large amounts of foam which are produced. In addition, the treatment generally requires several treating stages in order to remove a substantial portion of the surface active material. While this method is particularly suited to quite dilute solutions, when the solution becomes so dilute that it does not foam readily, additional removal of surface active agents becomes difficult and expensive. Even under the best conditons the removed surfactant is diluted by large amounts of water.

Froth flotation has also been employed to remove suspended particles from aqueous solutions. Froth flotation has sometimes been confused with foam fractionation, but the two are very different in principle. In froth flotation, the particles are treated to make them hydrophobic and then are removed from the water by being attached to rising bubbles of air.

Emulsion fractionation has also been considered for sewage treatment, although the process is notoriously expensive. This technique involves mixing an aqueous phase and an immiscible organic phase to form an emulsion. When the emulsion is partially broken, the concentration of surface active materials in the emulsion phase is greater than in either the aqueous or the organic liquid phase. By separating the emulsion phase and breaking the emulsion, a concentration of the interfacially active compounds will be found.

It has recently been discovered that organic anionic materials can be removed from their aquous solutions by complexing them with an anionic ion exchanger in an immiscible phase and thereafter breaking the complex to allow reuse of the ion exchanger and, where desired, recovery of the anionic materials. This process is disclosed and claimed in the application of H. N. Dunning, M. M. Kreevoy and J. M. White entitled Ion Exchange Process, Serial No. 105,807, filed April 26, 1961, now abandoned, which disclosure is incorporated herein by reference. Broadly stated, the inventive process of said application comprises admixing a solution of organic anionic material with an anionic ion exchanger in an immiscible phase to form a complex in the immiscible phase between the organic anionic material and anionic ion exchanger and separating the immiscible phase containing the complex. The latter phase can then be treated to break the complex and the anionic ion exchanger can be reused. The organic anionic material can, where desirable, be concentrated and recovered.

The process of the above-described application is effective for the removal of anionic detergents from sewage. The removal drastically reduces the amount of detergents being pumped from sewage disposal plants into rivers which are the source of potable water supplies for downstream communities. Such process is adaptable to continuous operation and, once established, the amount of treating chemicals used is very small. The cost of the treatment to remove anionic material may be largely defrayed by the value of the recovered chemical materials. The process is effective for the extraction of soaps as well as synthetic detergents.

A further variation of the above-described process is disclosed and claimed in the application of H. N. Dunning, M. M. Kreevoy and J. M. White entitled Ion Exchange of Anionic Surfactants, Serial No. 201,149, filed June 8, 1962, which disclosure is incorporated herein by reference. Broadly, the process of the invention of said application comprises contacting an aqueous solution of an organic anionic material with an anion exchange material in a water-immiscible organic solvent having a density less than the aqueous solution, passing a gas through both solutions while the solutions are in contact, and separating the resulting solutions. The organic phase can be treated to strip the organic anionic material therefrom and the organic phase can then be reused. Also, the organic anionic material can, where desirable, be concentrated and recovered.

The process of this latter-described application is also highly effective in separating and removing detergents from aqueous systems. It is adaptable to large scale treatment of sewage and industrial wastes with low cost per unit treated. Said process provides the same or a larger amount of transfer of the detergents to the organic phase as would considerable additional mixing, but without the attendant emulsion formation.

As indicated, these described processes effectively remove organic anionic materials from detergent-laden wastes. Various inorganic anionic materials, such as phosphates, polyphosphates, borates, nitrates, nitrites, sulfates and the like, are generally also at least partially removed by the processes. However, the resulting extracted aqueous solutions may still contain significant amounts of contaminants such as various inorganic phosphates and polyphosphates. These materials are commonly included in commercial detergent formulations as builders, brighteners and the like. It would be highly desirable to be able to remove at least a substantial portion of the contaminants remaining in the aqueous solutions after treatment with the anion exchange materials.

It is, therefore, an object of this invention to provide a novel and improved method of treating aqueous solutions containing organic anionic materials and other contaminants.

Another object of this invention is to provide such a method for the treatment of sewage and other detergent-laden waste waters.

These and other objects will become apparent from the following detailed description.

The objects of this invention are accomplished by a process which comprises contacting an aqueous waste solution containing organic anionic materials with an organic phase comprising a water-immiscible organic solvent and an anion exchange material to extract at least a portion of the organic anionic materials into the organic phase, separating the organic phase from the aqueous phase, and treating said aqueous phase with a basic material selected from the oxides, hydroxides and basic salts of the alkaline earth, alkali and/or rare earth metals. We have discovered that the treatment with the basic material produces a precipitate which can be separated by conventional means to yield an aqueous phase having a reduced solids content, phosphate content and chemical oxygen demand. The aqueous phase also has increased clarity. Thus our process provides substantially complete treatment of detergent-laden waste waters. Treatment of the original aqueous waste solution with the basic material prior to the extraction thereof with the anion exchange material is not effective.

The single figure of drawings is a simplified flow diagram illustrating the principle and optional steps of the process of the present invention.

A wide variety of anion exchange materials are useful in the process of the present invention. The term "anion exchange material" as used herein refers to ion exchange materials which are capable of exchanging anionic materials. Ion exchange materials are commonly designated by the type of ion which is absorbed, rather than by the chemical properties of the ion exchange material. Accordingly, anion exchange materials could be cationic compounds. The types of materials useful in the present invention are those anion exchange materials commonly referred to as "liquid ion exchange materials." The "liquid" refers to the fact that these ion exchange materials are used in solution rather than in a solid state as is the case with ion exchange resins. Many of the liquid ion exchange materials are liquids at room temperature, while others are normally solid materials. When the solid materials are dissolved in a suitable solvent, there is formed a solution which has ion exchange properties.

The preferred anion exchange materials are the water-immiscible amines and quaternary ammonium compounds. Suitable materials are illustrated in U.S. 2,877,250. Generally, all the anion exchange agents disclosed in that patent are operative in the present invention. With respect to these materials, several observations are in order. Amines which have a fairly high degree of insolubility in water are generally preferred since this will aid in preventing attrition of large amounts of amine. Consequently, it is preferred to employ materials having more than about 10 carbon atoms. As between the primary, secondary, and tertiary amines, the secondary amines are preferred. The secondary amines are generally less soluble in water than the primary amines and are usually more effective extractants. The tertiary amines are also good extractants, however they are often more expensive and somewhat more difficult to prepare than the secondary amines. One advantage that the amines possess is that they can be readily stripped and reused. On the other hand, the quaternary ammonium compounds are very difficult to strip and therefore, where the extractant is to be reused, the quaternary ammonium compounds are not as highly preferred as the amines. Because of their excellent ability to extract, the quarternary ammonium compounds are highly useful where the loaded ion exchange solution is not to be recirculated, but is to be used as a fuel or some other end use.

Specific examples of the above type compounds which are useful in the present invention include lauryl amine, myristyl amine, palmityl amine, stearyl amine, oleyl amine, linoleyl amine, laurylmethyl amine, myristylmethyl amine, palmitylmethyl amine, stearylmethyl amine, oleylmethyl amine, linoleylmethyl amine, dilauryl amine, dimyristyl amine, dipalmityl amine, distearyl amine, dioleyl amine, dilinoleyl amine, trilauryl amine, trioctyl amine, dilaurylmethyl amine, distearylmethyl amine, dioctyl amine, dibenzyl amine, diisooctyl amine, benzyllauryl amine, 3-phenylpropyltetradecyl amine, triisooctyl amine, benzyldilauryl amine, dibenzylmethyl amine, β-hydroxyethyldilauryl amine, β-hydroxydodecyl dinonyl amine, decylpiperidine, lauryl morpholine, octadecyl morpholine, lauryltrimethyl ammonium chloride, myristyltrimethyl ammonium chloride, palmityltrimethyl ammonium chloride, stearyltrimethyl ammonium chloride, oleyltriethyl ammonium chloride, linoleyltrimethyl ammonium chloride, dilauryldimethyl ammonium chloride, dimyristyldimethyl ammonium chloride, dipalmityldimethyl ammonium chloride, distearyldimethyl ammonium chloride, dioleyldimethyl ammonium chloride, dilinoleyldimethyl ammonium chloride, trilaurylmethyl ammonium chloride, trioctylmethyl ammonium chloride, tridecylmethyl ammonium chloride, stearylbenzyldimethyl ammonium chloride, N-trimethyl-N′-dimethyllauryl propylene diammonium dichloride, N-trimethyl-N′-dimethyl-tallow propylene diammonium dichloride, bis (1-isobutyl-3,5-dimethylhexyl) amine, bis (3,5,7-trimethyl octyl) amine, 6-benzyl amino-3,9-diethyl tridecane and N-lauryl-1,3-propylene diamine. Most of these preferred compounds are represented by the formulas:

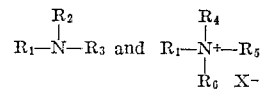

where $R_1$ is an aliphatic or aromatic radical of 6 to 24 carbon atoms, $R_2$ and $R_3$ are hydrogen or hydrocarbon radicals of 1 to 24 carbon atoms, $R_4$, $R_5$, and $R_6$ are hydrocarbons radicals of 1 to 24 carbon atoms and X is an inorganic anion. Compounds containing acetylenic unsaturation are generally not used as liquid ion exchange reagents because of the difficulty of preparation and because of their cost. However, if desired such nonpreferred agents can be employed.

Another group of materials which is useful in the present invention are the hydroxy fatty nitrogen compounds which have two nitrogen containing groups, one of which is situated on a carbon atom adjacent to a hydroxyl group, the other situated in a group occupying a terminal position. Commercially, these materials are prepared from oleic acid and accordingly have 18 carbon atoms in the main carbon chain. However, they may also be derived from other lower or higher molecular weight unsaturated acids. Because of the method of preparation, these materials are usually mixtures of isomers. Generally, the isomers are not separated for most commercial uses. Specific examples of such materials include 9-amino-10-hydroxystearonitrile, 9-dimethylamino-10-hydroxystearonitrile, 9-anilino-10-hydroxystearonitrile, 9-morpholino-10-hydroxystearonitrile, 10-dodecylamino-9-hydroxystearonitrile, 10-meta-aminophenyl-amino-9-hydroxystearonitrile, 9 - diethanolamino-10 - hydroxystearyl amine, 10-β-aminoethylamino-9-hydroxystearyl amine, 9-dodecylamine-10-hydroxystearylamine, 9-(β-cyanoethyl)-amino-10-hydroxystearonitrile, 10-N-(β-cyanoethyl)-dodecylamino-9-hydroxystearonitrile, 9-(gamma-aminopropyl)-methylamino - 10 - hydroxystearylamine, 9-(gamma-aminopropyl)-anilino - 10 - hydroxystearylamine, 9-morpholino-10-hydroxystearyl morpholine, 9-dimethyl amino-10-hydroxystearyldimethyl amine, 1,9-di(trimethyl ammonium)-10-hydroxyoctadecane dichloride, 1,9-di-(dimethylbenzyl ammonium)-10-hydroxyoctadecane dichloride, 1,9-di-(benzylmorpholinium)-1,10-hydroxyoctadecane dichloride, 1,9-di-(trimethyl ammonium)-9-hydroxyoctadecane dimethyl sulfate, 1,9-di-(trimethyl ammonium)-10-hydroxyoctadecane dibromide, 1-cyano-9-(trimethyl ammonium)-10-hydroxyheptadecane chloride, 1-cyano - 10 - (N-methylmorpholinium) - 9 - hydroxyheptadecane chloride, and 1-cyano-9-(trimethyl ammonium)-10-hydroxyheptadecane methyl sulfate. These preferred materials are represented by formulas:

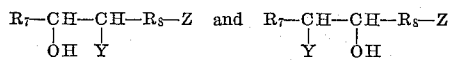

where $R_7$ and $R_8$ are aliphatic hydrocarbon radicals of 1 to 22 carbon atoms and the total number of carbon atoms in $R_7$ and $R_8$ is 6–22, Y is an amino radical or quaternary ammonium radical and Z is an amino radical, quaternary ammonium radical or nitrile.

The preferred organic solvents for the process of the present invention are the hydrocarbons. Examples of suitable hydrocarbon solvents include isoctane, kerosene, "Soltrol 170" (a commercially available naphthenic hydrocarbon solvent), benzene, toluene, xylene, isodecane, fuel oils, mineral oils, hexane, heptane, and octane. Solvents which contain functional groups can also be employed in the present invention providing that the functional groups do not adversely affect the extraction, and provided that the molecular weight is sufficiently high so as to make the organic solvents substantially insoluble in water. Illustrative of such compounds are the alcohols, aldehydes, ketones, and esters such as naturally occurring vegetable oils. The term "water-immiscible organic solvent" as used herein refers to an organic material normally liquid which is substantially, but not necessarily entirely, insoluble in water.

The process of the present invention can be used to treat aqueous waste solutions containing organic anionic materials regardless of the source of such waste solutions. Any surface active agent which exhibits anionic properties can be removed from the waste solutions by our process. It should be clearly understood that the process can be used to separate materials not generally used as surfactants or detergents as long as the material has the anionic and surface active properties. It should be noted that many natural wastes, or their degradation products fall into this classification: the fatty acids, carboxylic acids in general such as acetic, propionic, butyric, valeric, stearic, oleic, palmitic, glycerides, proteins, protein hydrolysates, amino acids, bile acids, uric acid, pyrrolidone carboxylic acid, sodium acetyl salicylic acid, chlorocrontonic acid, undecylenic acid, sorbic acid, citaconic acid, acrylic acid, and citric acid. In some cases, certain surfactants may be cationic or exhibit amphoteric properties under certain conditions, but if they exhibit anionic properties in the process of the present invention, they will be considered as anionic surfactants for purpose of the present invention. Examples of detergents which can be removed by the process of the present invention include the alkyl aryl sulfonates such as sodium dodecylbenzenesulfonate, sodium xylene sulfonate, sulfonated glycerines, alkyl phosphates, the alkyl alcohol sulfates, such as sodium lauryl sulfate, soaps, such as, sodium stearate, the β-alanines and other fatty amino acids and derivatives thereof such as sodium N-lauryl-β-amino propionate, disodium N-tallow-β-imino dipropionate, N-lauryl-β-aminopropionic acid, and the partial sodium salt of N-lauryl-β-imino dipropionate. These latter materials are amphoteric in nature, and can be separated by the process of the present invention under certain conditions. Still other surfactants which can be separated by the process of the present invention include diisobutyl sodium sulfosuccinate, alkyl naphthalene sodium sulfonate, sulfonated castor oil, sulfonated tall oil, sulfonated petroleum residuals, salts of sulfated fatty acid ester, perfluoro caprylic acid, sodium ligno sulfonate, sodium lauryl sulfoacetate, tetrasodium ethylenediamine tetracetic acid, sodium salt of alkyl aryl polyether sulfonate, ammonium salt of sulfate ester of an alkyl phenoxy polyethanol, polyoxyethylene sorbitan tall oil ester, sodium methyl oleyl taurate, sodium salt of a sulfonated naphthalene-formaldehyde condensate, terpene fatty acid salt complex, triethanolamine alkyl aryl sulfonate, and ammonium tridecyl benzene sulfonate.

As indicated above, the basic material is selected from the oxides, hydroxides and basic salts of the alkaline earth, alkali and/or rare earth metals. Representative of such materials are NaOH, KOH, Ca(OH)$_2$, Ba(OH)$_2$, CaO, BaO, MgO, Mg(OH)$_2$, CeO$_2$, and the like. Mixtures of such compounds can also be used. Those compounds which form insoluble salts of such materials as sulfates, phosphates, polyphosphates and the like are preferred as the basic materials. Such materials can be used either in solution, slurry or dry form.

The first step in the process involves the contacting of the aqueous waste solution containing the organic anionic material with the organic phase comprising the water-immiscible organic solvent and the anion exchange material. The volume phase ratio of the aqueous phase to the organic phase can vary widely depending on materials, concentrations, conditions, etc., but will generally be within the range of about 1:1 to 500,000:1 and preferably in the range of about 30:1 to 1000:1. The amount of anion exchange material in the organic phase also can be varied over wide limits but is preferably in the range of about 1.0 to 50.0 wt. percent. The aqueous phase and organic phase are preferably agitated during the contacting step. When an organic phase is used which has a density less than that of the aqueous solution, it is preferred to pass a gas through both solutions while they are in contact.

A wide variety of gaseous materials can be used. Examples include air, nitrogen, oxygen, hydrogen, helium, neon, argon, methane, ethane, propane, ethylene, propylene, acetylene, dichlorodifluoromethane, chlorotrifluoromethane, chlorodifluoromethane, 1,2-dichloro-1,1,2,2-tetrafluoroethane, and perfluorocyclobutene. The gas flow rate used is best determined by trial. Because surface active agents concentrate themselves on surfaces, the bubble surface presented to the aqueous solution is more important than the volumetric flow rate. Accordingly, any specification of the volumetric flow rate must necessarily depend upon the size of the bubble. This in turn, is dependent on the type of sparger or other bubbling apparatus employed. Generally, the volumetric flow rate should be sufficiently low such that there is not violent agitation in the treating vessel or tank. The volumetric flow rate for many situations would fall in the range of .01 to 2 cubic feet of gas per square foot of treating area. Types of gas distributing apparatus which can be used include sintered-glass air distributors, porous pipe spargers and perforated pipe spargers.

In some operations the aqueous waste solution is desirably acidified before the extraction step, preferably to a pH value below about 6.5 and desirably below about 6.0. Sulfuric acid, or any similar acid material may be used for this purpose. In other instances, the aqueous waste solution is treated without adjustment of the pH.

After the extraction step, the water-immiscible organic phase is separated from the aqueous phase by virtue of their immiscibility. The aqueous phase is then treated with the basic material. The method of the addition of the basic material to the aqueous phase is not critical. Thus, as indicated previously, the basic material may be added in solution, slurry or dry form. The method of mixing or treating the aqueous solution with the basic material is not critical either. All that is required is to obtain sufficient mixing of the basic material with the extracted waste solution to permit reaction or occlusion of the contaminants to form a precipitate. The amount of the basic material added will, of course, vary considerably depending upon the particular material employed, the extracted waste solution and the conditions. Generally, an amount of basic material sufficient to form a separable precipitate is employed. Preferably about 0.005 to 0.5 wt. percent of the basic material will be employed, based on the weight of the extracted waste solution.

The precipitate can be removed by any conventional method. Thus conventional sedimentation techniques and equipment can be employed or aeration can be employed to float the flocculent precipitate. Centrifugation or hydroclone techniques can be used to hasten the gravitational effects. In addition, high molecular weight materials may be added to speed separation by flocculation or flotation. Representative of such materials are guar gum, guar or vegetable gum derivatives, Separan (a polyacrylamide available from cyanamide), and other flocculants. Regular coagulation aids may also be used such as traces of $FeCl_3$. Such aids tend to speed flocculation and increase particle size.

Separation of the precipitate yields an aqueous effluent which is substantially free of organic anionic materials, has increased clarity, and has a markedly reduced solids content, phosphate content and chemical oxygen demand. Our process thus provides substantially complete treatment of aqueous waste solutions such as detergent-laden wastes. In most cases no further treatment is necessary of the aqueous effluent even where it is to be recycled for reuse such as launderettes. However, the effluent can optionally be chlorinated, any entrained or dissolved anion exchange material can be removed and the like.

Where it is desired to recover the organic anionic material from the organic phase and/or reuse the organic phase, the loaded anion exchange material can be stripped by treatment with a material which may be an aqueous basic solution or electrolyte, or certain acidic materials. Exemplary stripping solutions include solutions of sodium hydroxide, calcium hydroxide, barium hydroxide, soda, lime, ammonium hydroxide-ammonium chloride buffer, sodium carbonate, disodium hydrogen phosphate-sodium biphosphate buffer, ammonium acetate, sodium bicarbonate-sodium chloride mixture, methylamine, sodium perchlorate, calcium chloride, hydrochloric acid, sulfuric acid and the like. Emulsion formation during the stripping can be effectively countered by the addition of small amounts of additives such as isopropyl alcohol, n-decyl alcohol, dodecyl phenol, silicone fluids and other de-emulsifying agents. In addition to these solutions, solid stripping agents, usually of a caustic nature such as sodium, calcium and barium hydroxides, soda, and the like may also be used. The organic anionic materials can be discarded along with the stripping agents or solutions or they can be recovered, where desired, from such agents or solutions. The stripped organic phase can be recycled for use in the extraction step.

The process of the present invention can be carried out over a wide variety of temperatures. Generally, it is preferred to carry out the process at temperatures in the range of 25 to 75° C. The temperature limits are governed by the freezing and boiling points of the liquid phases. One advantage of the present process is that where the treated aqueous solution is to be reused, such as in a laundry operation, the process can be carried out without cooling down the aqueous phase, thereby saving considerable amounts of money in heating the water.

Our process can also be carried out continuously. Thus the aqueous waste solution and organic phase can be contacted at predetermined rates, separated continuously and the extracted aqueous phase can be treated with predetermined amounts of basic materials with continuous removal of the resulting precipitate. If desired, the loaded organic phase can be stripped and the organic phase then recycled continuously for use in the extraction step. The methods and apparatus disclosed in the above-noted copending applications can be used in the present process for the extraction, separation, stripping and recycling steps. The treating step with the basic material can be carried out in a conventional treating vessel or tank equipped with means for removing or separating the precipitate from the effluent.

In order to further illustrate certain embodiments of the present invention, the following examples are included.

EXAMPLE I

In a 70 gallon tank approximately 5 feet high, 2½ feet long and 1 foot wide equipped with a 2-foot aerator cylinder 2½ inches in diameter which is perforated and wrapped with a cord in order to produce fine bubbles was treated dirty launderette effluent containing 73 p.p.m. sodium dodecyl benzene sulfonate, 22 p.p.m. phosphate, 1265 p.p.m. total solids and having a chemical oxygen demand of 296 p.p.m. The ion exchange feed used to treat this material was a solution of dioleyl amine in "Soltrol 170" (a commercially available naphthenic hydrocarbon solvent) at a concentration of 40 grams amine per liter of solvent. The initial pH of the effluent was 9.0 and the air flow rate was about 0.87 cubic feet per minute. The volumetric ratio of aqueous phase to organic phase was 25:1. The temperature was 52° C. There was obtained a continuous stream of turbid extracted effluent containing 0.7 p.p.m. sodium dodecyl benzene sulfonate, 215 p.p.m. phosphate, 1374 p.p.m. total solids and having a chemical oxygen demand of 225 p.p.m.

To a one hundred milliliter portion of the extracted effluent was added 10 ml. of saturated lime water with shaking. A heavy floc rapidly formed which settled in 9 minutes leaving a clear treated aqueous effluent containing 0.7 p.p.m. sodium dodecyl benzene sulfonate, 67 p.p.m. phosphate, 1046 p.p.m. total solids and having a chemical oxygen demand of 63.

This example illustrates that the treatment of the extracted aqueous waste solution with the basic material according to our process markedly reduces the phosphate content, the total solids content and chemical oxygen demand. The results are summarized in the following Table I.

*Table I*

|  | Raw Aqueous Waste Solution | Extracted Waste Solution | Percent Reduction | Extracted and treated Waste Solution | Percent Reduction | Total Percent Reduction |
|---|---|---|---|---|---|---|
| pH | 9 | 4.8 |  | 8.1 |  |  |
| Sodium Dodecyl Benzene Sulfonate | 73 | 0.7 | 99 | 0.7 | 0 | 99 |
| Phosphate ($PO_4$) | 222 | 215 | 3.2 | 67 | 68.8 | 70 |
| Chemical Oxygen Demand [1] | 296 | 225 | 24.0 | 63 | 72.0 | 79 |
| Total Solids | 1,265 | 1,374 | +8.6 | 1,046 | 23.9 | 17 |
| Appearance | Turbid | Turbid |  | Clear |  |  |

[1] The Chemical Oxygen Demand was determined according to the accepted procedure in "Standard Methods for the Examination of Waste and Waste Water," 11th ed., 1960, USPHS, New York.

The data of the above table also show that the extracted and treated effluent has a pH of 8 which is particularly advantageous since it is non-corrosive and can thus be readily handled. Additionally, the calcium content is increased slightly to provide an optimum balance of sodium and calcium to give best soil permeability.

EXAMPLE II

To a 100 ml. portion of the raw aqueous waste solution of Example I was added 10 ml. of saturated lime water with shaking. After 35 minutes only a slight floc developed. Very little of the floc settled and the effluent was still turbid. This example illustrates that treatment of the aqueous waste solutions with the basic material prior to extraction with the anion exchange material is ineffective.

EXAMPLE III

Example I was repeated using a dirty launderette effluent containing 60 p.p.m. sodium dodecyl benzene sulfonate, 153 p.p.m. phosphate, and having a chemical oxygen demand of 380 p.p.m. A quart of the resulting extracted aqueous waste solution was treated with 0.2 g. dry $Ca(OH)_2$. The results are summarized in the following Table II.

*Table II*

|  | Raw Aqueous Waste Solution | Extracted Waste Solution | Percent Reduction | Extracted and Treated Waste Solution | Percent Reduction | Total Percent Reduction |
|---|---|---|---|---|---|---|
| pH | 9 | 4.3 |  | 9.3 |  |  |
| Sodium Dodecyl Benzene Sulfonate | 60 | 0.6 | 99 | 0.6 | 0 | 99 |
| Phosphate ($PO_4$) | 153 | 142 | 5.9 | 8.0 | 94.4 | 95 |
| Chemical Oxygen Demand [1] | 380 | 190 | 50.0 | 85 | 55.3 | 78 |
| Total Solids |  | 1,236 |  | 1,157 | 6.4 | 6.4 |
| Appearance | Turbid | Turbid |  | Clear |  |  |

[1] Determined as in Example I.

The treatment with the dry $Ca(OH)_2$ produced a floc very rapidly. After 15 minutes, the clear effluent was simply poured off.

EXAMPLE IV

To a 100 ml. portion of an extracted waste solution containing 184 p.p.m. phosphate prepared in a manner similar to the extracted solutions of Examples I and II was added 2 ml. of an aqueous NaOH solution. This raised the pH to 10 and a precipitate was formed and separated yielding a clear effluent containing 123 p.p.m. phosphate.

EXAMPLE V

A dirty launderette effluent was extracted in the same manner as set forth in Example I to yield a turbid solution having a phosphate content of 44 p.p.m. The solution was pumped through a soda-lime column to yield an effluent containing only 5 p.p.m. phosphate and having a pH of 12.5.

It is to be understood that the invention is not to be limited to the exact details of operation or the exact processes shown or described, as obvious modifications and equivalents will be apparent to those skilled in the art and the invention is to be limited only by the scope of the appended claims.

The embodiments of the invention in which an exclusive property or privilege is claimed are defined as follows:

1. The process which comprises contacting an aqueous waste solution containing organic anionic surface active agents with a liquid organic phase comprising a water-immiscible organic solvent and an anion exchange material to extract at least a portion of the organic anionic surface active agents into the organic phase, separating the loaded organic phase from the aqueous phase and treating said aqueous phase with a basic material selected from the group consisting of alkali, alkaline earth and rare earth metal oxides, hydroxides, basic salts and mixtures thereof to form a precipitate.

2. The process of claim 1 wherein the precipitate is separated from the aqueous phase.

3. The process of claim 1 wherein the extracted organic anionic surface active agents are stripped from the loaded organic phase with a stripping agent selected from the group consisting of aqueous solutions of bases, acids and salts and solid stripping agents insoluble in said organic phase.

4. The process of claim 1 wherein the aqueous waste solution is acidified to promote extraction.

5. The process of claim 1 wherein at least a portion of the organic anionic surface active agents is sodium dodecyl benzene sulfonate.

6. The process of claim 1 wherein the aqueous waste solution and organic phase are agitated during the contacting thereof.

7. The process of claim 1 wherein the organic phase has a density less than the aqueous waste solution and a gas is passed through both solutions during the contacting thereof.

8. The process of claim 7 wherein the gas is air.

9. The process of claim 1 wherein the water-immiscible organic solvent is a hydrocarbon solvent.

10. The process of claim 1 wherein the anion exchange material is a water-immiscible amine.

11. The process of claim 10 wherein the amine has 1 to 3 alkyl chains and contains a total of more than 10 carbon atoms.

12. The process of claim 1 wherein the basic material is $Ca(OH)_2$.

13. The process of claim 1 wherein the basic material is NaOH.

14. The process of claim 1 wherein the basic material is used in the form of an aqueous solution.

15. The process which comprises contacting an aqueous waste solution containing organic anionic surface active agents with an anion exchange material in a water-immiscible organic solvent to extract at least a portion of the organic anionic surface active agents into the liquid organic phase, separating the loaded organic phase from the aqueous phase, stripping the organic anionic surface active agents from the loaded organic phase, recycling the organic phase, treating the aqueous phase with a basic material selected from the group consisting of alkali, alkaline earth and rare earth metal oxides, hydroxides, basic salts and mixtures thereof to form a precipitate and separating the precipitate from the aqueous phase.

16. In the process of purifying aqueous solutions containing organic anionic surface active agents wherein said solutions are contacted with an anion exchange material in a water-immiscible, liquid, organic solvent to remove at least a portion of the organic anionic surface active agents from the aqueous solution, the improvement comprising treating the extracted aqueous waste solution with a basic material selected from the group consisting of alkali, alkaline earth and rare earth metal oxides, hydroxides, basic salts and mixtures thereof to form a precipitate and separating the precipitate from the extracted and treated aqueous waste solution.

17. The process of claim 1 wherein the basic material is used in an amount of about 0.005 to 0.5 weight percent based on the weight of the extracted aqueous waste solution.

References Cited by the Examiner
UNITED STATES PATENTS 2,995,512  8/1961  Weidner et al. _____ 210—54

OTHER REFERENCES

Stein: "Water Purification Plants and Their Operation," 3rd ed., 1926, pages 162–163 relied upon.

MORRIS O. WOLK, *Primary Examiner.*

E. G. WHITBY, *Assistant Examiner.*